(12) United States Patent
Murray et al.

(10) Patent No.: US 9,232,694 B2
(45) Date of Patent: Jan. 12, 2016

(54) COMBINE SIDE SHAKE CLEANING CONTROL SYSTEM

(71) Applicant: CNH Industrial America LLC, New Holland, PA (US)

(72) Inventors: Craig E. Murray, Davenport, IA (US); Orlin W. Johnson, Geneseo, IL (US); Dale W. Panoushek, Orion, IL (US); Tyler L. Nelson, Rochester, MN (US); Kevin S. Schwinn, Orion, IL (US); Bin Lou, Bolingbrook, IL (US)

(73) Assignee: CNH Industrial America LLC, New Holland, PA (US)

(*) Notice: Subject to any disclaimer, the term of this patent is extended or adjusted under 35 U.S.C. 154(b) by 0 days.

(21) Appl. No.: 14/496,527

(22) Filed: Sep. 25, 2014

(65) Prior Publication Data

US 2015/0012190 A1    Jan. 8, 2015

Related U.S. Application Data

(63) Continuation of application No. 13/331,141, filed on Dec. 20, 2011, now Pat. No. 8,880,299.

(51) Int. Cl.
*G06F 7/70* (2006.01)
*A01D 75/28* (2006.01)
*A01F 12/44* (2006.01)

(52) U.S. Cl.
CPC ............ *A01D 75/282* (2013.01); *A01F 12/448* (2013.01)

(58) Field of Classification Search
CPC ........... A01D 41/1274; A01D 41/1276; A01D 41/142; A01D 69/10; A01D 75/187; A01F 12/10; A01F 12/44; A01F 29/14; A01F 29/16; F16H 61/4104
See application file for complete search history.

(56) References Cited

U.S. PATENT DOCUMENTS

| | | | |
|---|---|---|---|
| 86,942 | A | 2/1869 | Robinson |
| 853,061 | A | 5/1907 | Case |
| 2,123,876 | A | 7/1938 | Berry et al. |
| 2,189,706 | A | 2/1940 | Clipston |
| 4,259,829 | A * | 4/1981 | Strubbe ............................ 460/5 |
| 4,332,127 | A * | 6/1982 | Staiert et al. ...................... 460/3 |
| 4,355,647 | A | 10/1982 | Heidjann et al. |
| 4,736,753 | A | 4/1988 | Glaubitz et al. |
| 6,393,813 | B1 * | 5/2002 | Nowak ........................ 56/10.2 J |
| 7,140,169 | B2 * | 11/2006 | Ameye et al. .................. 56/11.9 |
| 7,322,882 | B2 | 1/2008 | Duquesne et al. |
| 7,927,199 | B2 | 4/2011 | Adamson et al. |
| 2006/0229119 | A1 | 10/2006 | Wamhof et al. |

* cited by examiner

*Primary Examiner* — Redhwan k Mawari
(74) *Attorney, Agent, or Firm* — Patrick M. Sheldrake

(57) ABSTRACT

A combine side-shaking control system and a method for controlling operation of a side-shaking mechanism in a combine. The control system includes at least one sieve for separating crop material from other materials and a movable side-shaking mechanism coupled to the at least one sieve and configured to move the at least one sieve in a side-to-side motion. The control system also includes at least one sensor for sensing at least one operating condition of a combine system. The control system further includes a controller for receiving the at least one operating condition and causing the side-shaking mechanism to stop moving the at least one sieve in the side-to-side motion or start moving the at least one sieve in the side-to-side motion based on the at least one operating condition.

6 Claims, 11 Drawing Sheets

COMBINE SIDE SHAKE CLEANING CONTROL SYSTEM

This divisional application claims priority under 35 U.S.C. §120 from co-pending U.S. patent application Ser. No. 13/331,141 filed on Dec. 20, 2011 by Craig E. Murray, Orlin W. Johnson, Dale W. Panoushek, Tyler L. Nelson, Kevin S. Schwinn, and Bin Lou with the same title, the full disclosure of which is hereby incorporated by reference.

TECHNOLOGY FIELD

The present invention relates generally to a control system for a side shake cleaning mechanism for use with a harvester, such as a combine harvester, and more particularly to methods and systems to control a side shake cleaning mechanism in a combine harvester.

BACKGROUND

A combine harvester is a machine that is used to harvest grain crops. The objective is to complete several processes, which traditionally were distinct, in one pass of the machine over a particular part of the field. Among the crops that may be harvested with a combine are wheat, oats, rye, barley, corn, soybeans, flax or linseed, and others. The waste (e.g., straw) discharged on the field includes the remaining dried stems and leaves of the crop which may be, for example, chopped and spread on the field as residue or baled for feed and bedding for livestock.

A combine harvester cuts crop using a wide cutting header. The cut crop may be picked up and fed into the threshing and separating mechanism of the combine, typically consisting of a rotating threshing rotor or cylinder to which grooved steel bars commonly referred to as rasp bars or threshing elements may be bolted. These rasp bars thresh and aid in separating the grains from the chaff and straw through the action of the drum against the concaves, i.e., shaped "half drum," that may also be fitted with steel bars and a meshed grill, through which grain, chaff and smaller debris may fall, whereas the straw, being too big or long, is carried through to the outlet. The chaff, straw, and other undesired material are returned to the field via a spreader mechanism.

In an axial flow combine, this threshing and separating system serves a primary separation function. The harvested crop is threshed and separated as it is conveyed between a longitudinally arranged rotor and the inner surface of an associated chamber comprising threshing and separating concaves, and a rotor cage or cover. The cut crop material spirals and is conveyed along a helical path along the inner surface of the chamber until substantially only larger residue remains. When the residue reaches the end of the threshing drum, it is expelled out of the rear of the combine. Meanwhile, the grain, chaff, and other small debris fall through the concaves and grates onto a cleaning device or shoe. For ease of reference, this smaller particulate crop material that contains the grain and chaff is referred to as threshed crop. The grain still needs to be further separated from the chaff by way of a winnowing process.

Clean grain is separated out of the threshed crop be way of a flat oscillating cleaning system that can include a combination of oscillating screens (sieves), a fan which blows air through/above/beneath the sieves, and some mechanism which transports the material to be cleaned from beneath the threshing system to the sieves. Clean grain that is separated from residue via the sieves is typically transported to a grain tank in the combine for temporary storage. The grain tank is typically located atop the combine and loaded via a conveyer that carries clean grain collected in the cleaning system to the grain tank. The grain may then be unloaded through a conveying system to a support trailer or vehicle, allowing large quantities of grain to be unloaded in the field without needing to stop harvesting when the grain tank fills.

Presently, combines may be equipped with hillside compensation mechanisms for combine cleaning systems. Under flat ground operation, the cleaning system of a combine moves in 2-dimensional motion, shaking fore/aft with some vertical component. U.S. Pat. No. 7,322,882, which is incorporated herein for its teachings on cleaning system compensation mechanisms, describes a grain cleaning side-shaking mechanism which provides compensation to the cleaning system when the combine experiences a change in inclination (i.e. harvesting on uneven terrain). Other side-shaking mechanisms are described in U.S. Pat. No. 4,736,753; U.S. Pat. No. 7,927,199; and U.S. Pat. No. 7,322,882, which are also incorporated herein for their teachings on cleaning system compensation mechanisms.

Conventional side-shaking mechanisms, do not affect any changes to the 2-dimensional (fore/aft/vertical) movement of the cleaning system on flat ground. On inclined ground, however, the side-shaking mechanisms introduce an additional side-to-side component in the shake geometry of a sieve, causing material to resist its natural tendency to migrate to the lower side of the sieve and remain more evenly distributed across the width of the sieve.

SUMMARY

Embodiments of the present invention provide a control system for a side shake cleaning mechanism. Embodiments of the present invention utilize sensors for sensing one or more operating conditions of a combine and a controller which causes the side shake cleaning mechanism to deactivate and stop moving at least one sieve in the side to side motion or activate and start moving the at least one sieve in the side-to-side motion based on the at least one operating condition of the combine.

Embodiments of the present invention are directed to a combine side-shaking control system. The control system includes at least one sieve for separating crop material from other materials and a movable side-shaking mechanism coupled to the at least one sieve and configured to move the at least one sieve in a side-to-side motion. The control system also includes: a separator system engaging sensor for sensing if a separator system is engaged; a feeder system engaging sensor for sensing if the feeder system is engaged; operational system speed sensors for sensing respective operational speeds of at least one of a combine engine, a combine drive system, the combine feeder system, a combine crop-handling system, a combine threshing system, a combine cleaning system and a combine residue system; crop flow sensors for sensing respective crop rates moving through at least one of the combine feeder system, the combine crop-handling system, the combine threshing system, the combine cleaning system and the combine residue system; and a feeder system position sensor for sensing a position of a feeder mechanism relative to a portion of a combine frame. The control system further includes a controller for (i) receiving sensed data from the separator system engaging sensor, the feeder system engaging sensor, the operational system speed sensors, the crop flow sensors and the feeder system position sensor, and (ii) causing the side-shaking mechanism to stop moving the at least one sieve or start moving the at least one sieve in the side-to-side motion based on the sensed data.

According to one embodiment of the invention, the separator system engaging sensor indicates that the separator system is engaged if at least one of the combine feeder system, the combine crop-handling system, the combine threshing system, the combine cleaning system and the combine residue system is engaged.

According to one embodiment of the invention, the control system further includes a comparator for comparing each of the operational speeds to respective predetermined speed threshold values to produce compared operational speed values. The controller causes the side-shaking mechanism to stop moving the at least one sieve or start moving the at least one sieve in the side-to-side motion based on the compared operational speed values.

According to as aspect of one embodiment of the invention, the comparator compares a combine ground speed to a predetermined ground speed threshold value to produce a compared combine ground speed value. The controller causes the side-shaking mechanism to stop moving the at least one sieve or start moving the at least one sieve in the side-to-side motion based on the compared combine ground speed value over a predetermined period of time.

According to one embodiment of the invention, the control system further includes a comparator for comparing the crop rates to respective predetermined crop rate threshold values to produce compared crop rate values. The controller causes the side-shaking mechanism to stop moving the at least one sieve or start moving the at least one sieve in the side-to-side motion based on the compared crop rate values.

According to one embodiment of the invention, the position of the feeder mechanism includes an angle relative to the portion of the combine frame and the side-shaking control system further includes a comparator for comparing the angle of the feeder mechanism to a predetermined angle to produce a compared angle. The controller causes the side-shaking mechanism to stop moving the at least one sieve or start moving the at least one sieve in the side-to-side motion based on the compared angle.

According to one embodiment of the invention, the control system further includes a user interface. The controller receives user interface data responsive to a user interface input and causes the side-shaking mechanism to stop moving the at least one sieve in the side-to-side motion or start moving the at least one sieve in the side-to-side motion based on the user interface data independent from the sensed data.

Embodiments of the present invention are also directed to a combine side-shaking control system. The control system includes at least one sieve for separating crop material from other materials and a movable side-shaking mechanism coupled to the at least one sieve and configured to move the at least one sieve in a side-to-side motion. The control system also includes at least one sensor for sensing at least one operating condition of a combine system. The control system further includes a controller for receiving the at least one operating condition and causing the side-shaking mechanism to (i) stop moving the at least one sieve in the side-to-side motion or (ii) start moving the at least one sieve in the side-to-side motion based on the at least one operating condition.

According to one embodiment of the invention, if the at least one sieve is stationary and is not in a predetermined zero position, the controller further causes the side-shaking mechanism to move to a predetermined zero position and remain in the predetermined zero position until the at least one operational condition has reached a predetermined threshold value in at least one of a combine feeding system, a combine crop-handling system, a combine threshing system, a combine cleaning system and a combine residue system. The predetermined zero position corresponds to a position of the side-shaking mechanism substantially centered between first and second side limits of the side-to-side motion.

According to one embodiment of the invention, the at least one operating condition is an operating condition of a combine system from a group of combine systems comprising: a combine separator system; a combine feeder system; a combine engine; a combine threshing system; a combine cleaning system; a combine crop-handling system; a combine residue system; and a combine drive system.

According to as aspect of one embodiment of the invention, the at least one operating condition sensed by the at least one sensor is from a group of operating conditions. The group of operating conditions include: whether the combine separator system is activated, the combine separator system comprising at least one of the combine feeder system, the combine crop-handling system, the combine threshing system, the combine cleaning system and the combine residue system; whether the feeder system is activated independent from the separator system; whether an operational system speed has reached a predetermined speed threshold value in at least one of the combine drive system, the combine feeder system, the combine crop-handling system, the combine threshing system, the combine cleaning system and the combine residue system; whether an operational system speed of a combine system has reached a predetermined speed threshold value for a predetermined amount of time in at least one of the combine feeder system, the combine crop-handling system, the combine threshing system, the combine cleaning system and the combine residue system; whether a rate of crop flow has reached a predetermined threshold value in at least one of the combine feeder system, the combine crop-handling system, the combine threshing system, the combine cleaning system and the combine residue system; and whether a position of a feeder mechanism of the combine feeder system has reached a predetermined threshold position, wherein the position of the feeder mechanism includes an angle of the feeder mechanism relative to a combine frame.

According to as aspect of one embodiment of the invention, the controller receives a first operating condition of the group of operating conditions from a first sensor of the at least one sensor and the controller causes the side-shaking mechanism to stop moving the at least one sieve in the side-to-side motion based on the first operating condition. The controller receives a second operating condition of the group of operating conditions from the first sensor and the controller causes the side-shaking mechanism to start moving the at least one sieve in the side-to-side motion based on the second operating condition.

According to as aspect of one embodiment of the invention, the controller receives a first operating condition of the group of operating conditions from a first sensor of the at least one sensor and the controller causes the side-shaking mechanism to stop moving the at least one sieve in the side-to-side motion based on the first operating condition. The controller receives a second operating condition of the group of operating conditions from a second sensor of the at least one sensor and the controller causes the side-shaking mechanism to start moving the at least one sieve in the side-to-side motion based on the second operating condition.

Embodiments of the present invention are also directed to a method for controlling operation of a side-shaking mechanism in a combine. The method includes enabling the side-shaking mechanism, moving the side-shaking mechanism to a predetermined zero position and receiving incline data, from an incline sensor, representing the inclination of the combine. The method also includes receiving sensed data, from at least one sensor, representing at least one operating condition of a combine system. The method further includes causing the side-shaking mechanism to (i) stop moving at least one sieve in the side-to-side motion or (ii) start moving the at least one sieve in a side-to-side motion based on the incline data and the sensed data.

According to one embodiment of the invention, receiving sensed data, from at least one sensor, representing at least one operating condition of a combine system further includes receiving sensed data from a combine separator system indicating whether the separator system is activated, the separator system comprising at least one of a combine feeder system, a combine crop-handling system, a combine threshing system, a combine cleaning system and a combine residue system; receiving sensed data from a combine feeder system indicating whether the combine feeder system is activated independent from the combine separator system; receiving data indicating whether an operational system speed has reached a predetermined speed threshold value in at least one of the combine drive system, the combine feeder system, the combine crop-handling system, the combine threshing system, the combine cleaning system and the combine residue system; receiving data indicating whether an operational system speed of a combine system has reached a predetermined speed threshold value for a predetermined amount of time in at least one of the combine feeder system, the combine crop-handling system, the combine threshing system, the combine cleaning system and the combine residue system; receiving data indicating whether a rate of crop flow has reached a predetermined threshold value in at least one of the combine feeder system, the combine crop-handling system, the combine threshing system, the combine cleaning system and the combine residue system; and receiving data indicating whether a position of a feeder mechanism of the combine feeder system has reached a predetermined threshold position. The position of the feeder mechanism includes an angle of the feeder mechanism relative to a combine frame.

According to one embodiment of the invention, the predetermined zero position corresponds to a position of the side-shaking mechanism substantially centered between first and second side limits of the side-to-side motion, and the incline data indicates a first distance for moving the side-shaking mechanism away from the predetermined zero position on each side. The method further includes receiving side-shaking mechanism bias data indicating a second distance for moving the side-shaking mechanism away from the predetermined zero position on each side. Causing the side-shaking mechanism to (i) stop moving at least one sieve in the side-to-side motion or (ii) start moving the at least one sieve in a side-to-side motion is based on the incline data, the sensed data and the side-shaking mechanism bias data.

According to one embodiment of the invention, the method further includes disabling the side-shaking mechanism. Causing the side-shaking mechanism to (i) stop moving at least one sieve in the side-to-side motion or (ii) start moving the at least one sieve in a side-to-side motion is based on the side-shaking mechanism bias data if the side-shaking mechanism is disabled and the sensed data, the incline data and the side-shaking mechanism bias data if the side-shaking mechanism is enabled.

According to one embodiment of the invention, receiving data indicating whether an operational system speed has reached a predetermined speed threshold value includes receiving a compared engine speed value indicating whether a speed of the combine engine has reached a predetermined percentage of a high idle speed of the combine engine.

According to as aspect of one embodiment of the invention, receiving data indicating whether an operational system speed has reached a predetermined speed threshold value includes receiving a compared cleaning system speed value indicating whether a speed of the combine cleaning system has reached a predetermined percentage of a high idle speed of the combine engine.

According to as aspect of one embodiment of the invention, receiving data indicating whether a rate of crop flow has reached a predetermined threshold value includes receiving a compared crop flow value indicating whether a rate of crop flow has reached a predetermined percentage of a combine system flow capacity.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION OF ILLUSTRATED EMBODIMENTS

Figure 1:
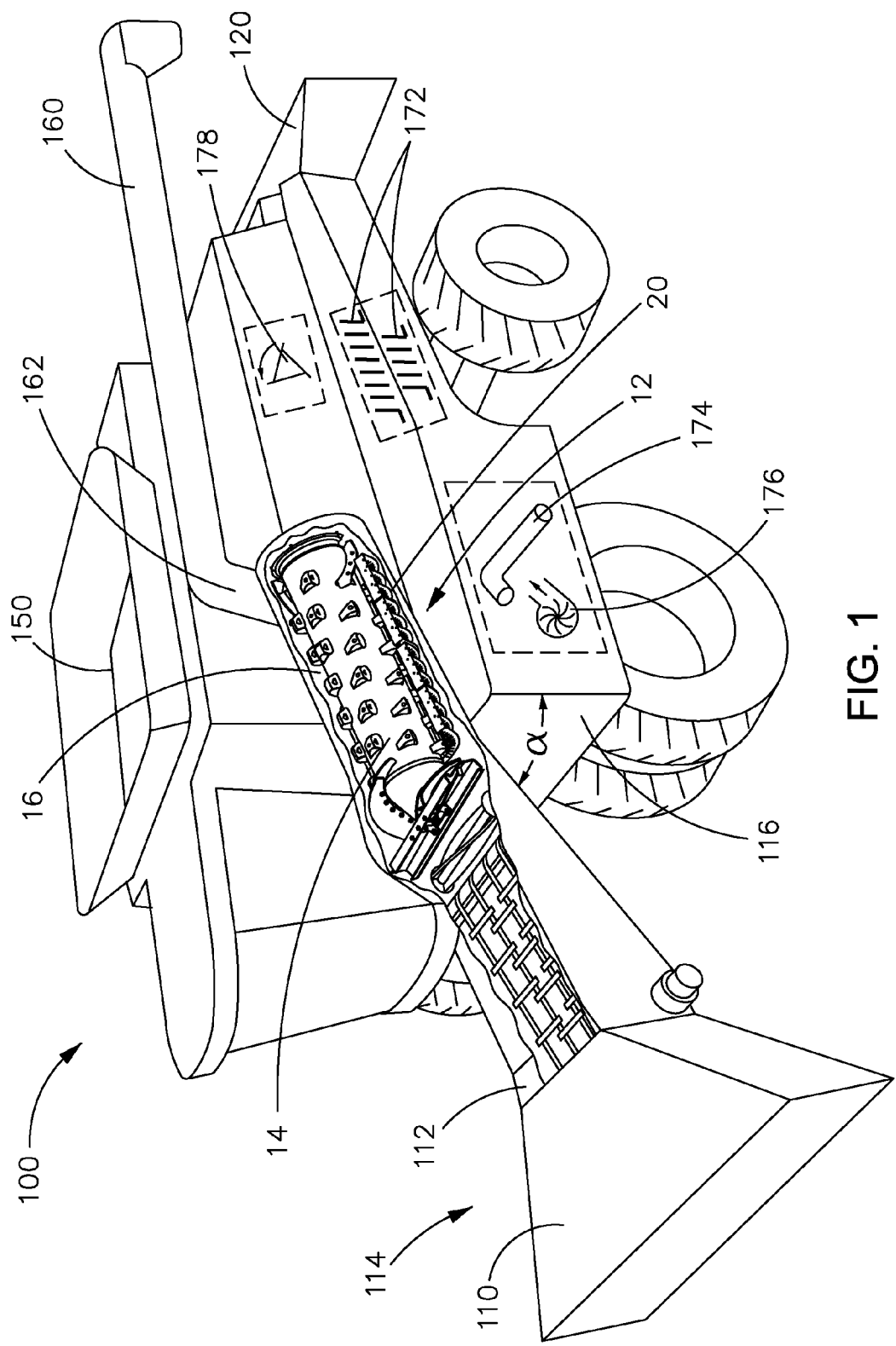
FIG. 1 illustrates a perspective view of an exemplary combine for use with embodiments of the present invention.

The side-to-side component that is introduced by exemplary side-shaking mechanisms described in this document is defined herein to be side-to-side motion. In some embodiments, the side-to-side motion of a combine side shake mechanism may result in the at least one sieve moving in an arc. In other embodiments, the side-to-side motion of a combine side shake mechanism may result in the at least one sieve moving in a substantially diagonal motion.

A number of shortcomings were discovered by the inventors for conventional side-to-side motion. By imparting side-to-side motion (i.e. the side shake mechanism) in a third dimension, hillside compensation mechanisms or side-shaking mechanism, may introduce a significant component of vibration to the combine. The added side-to-side motion increases the stresses acting on the structure and systems of the combine regardless of the level of side-to-side motion (less for smaller inclination and more for larger inclination), negatively impacting operation and reliability. The added component of side-to-side motion is readily detectable by the combine operator in the cab, causing discomfort and fatigue. The vibration is more prevalent when all systems are engaged but the machine is not harvesting and the combine is stationary, which is when the operator expects and desires the combine motion to remain relatively static.

Combines equipped with hillside compensation systems may enable the side-to-side movement concurrently with engagement of the separating system. The separator is comprised of the combine's internal components used to process the crop. The separator system may include a number of subsystems such as the threshing system, the cleaning system, crop-handling systems, the residue system, the combine feeder system and the drive systems, which are used to run the other subsystems. The separating system is typically engaged at an engine speed significantly lower than normal operating speed (which can be done independent of ground speed), enabling the side shake mechanism at a less than optimal operating speed with no benefit to harvesting. Negative vibrational effects may be significantly higher when the side shake mechanism is enabled at a frequency less than the optimal operating speed.

Each system of an exemplary combine may include an optimal operating speed or an optimal operating speed range, depending on the field conditions during operation. The side-shaking mechanism may, however, become no longer desirable if the speed of a system falls below an operating speed threshold. The side-shaking mechanism may also become no longer desirable when the combine systems are running at full speed, but the ground speed of the combine stops for a certain amount of time (i.e. stationary unloading in the field with the separator system engaged, remaining stationary to check monitors, etc.) and the combine is not harvesting.

Exemplary combine systems may disable the side-shaking mechanism at different states of operation, such as for example, when the separating system is disengaged and the combine is on an incline (i.e. stationary unloading in the field with separator off). When the side-shaking mechanism is disabled, the side-shaking mechanism comes to rest at a stationary position. This stationary position may be undesirable, however, because the side-shaking mechanism may start moving without any delay for acclimation when the side-shaking mechanism is enabled.

These shortcomings have motivated the creation of the present invention. The present invention is directed to embodiments of a side shake control system. Some embodiments of the present invention utilize sensors and a controller for causing the side shake mechanism to stop moving at least one sieve in the side-to-side motion or start moving at least one sieve in a side-to-side motion.

Figure 2:
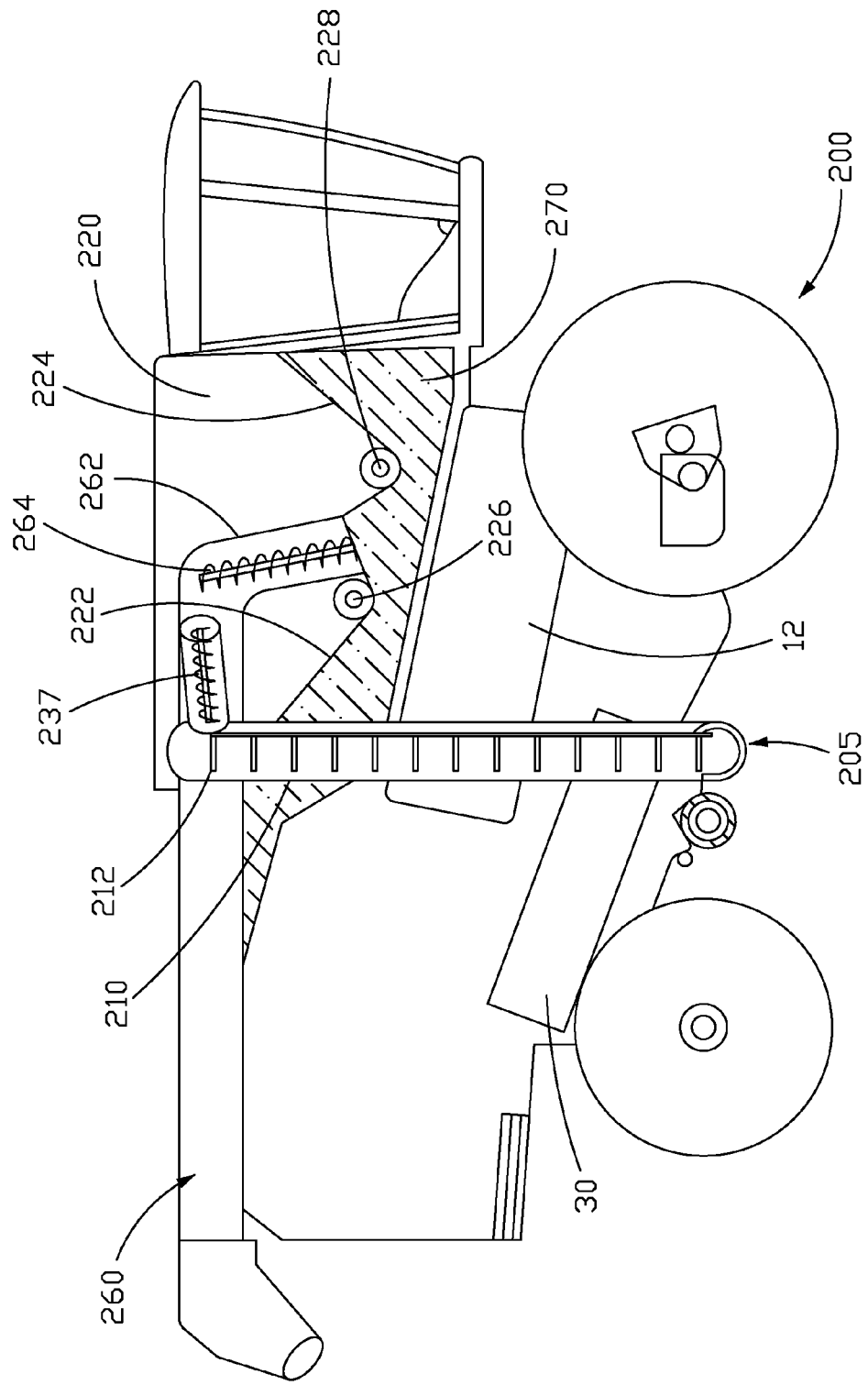
FIG. 2 illustrates a side view of an exemplary combine for use with embodiments of the present invention.
Figure 3:
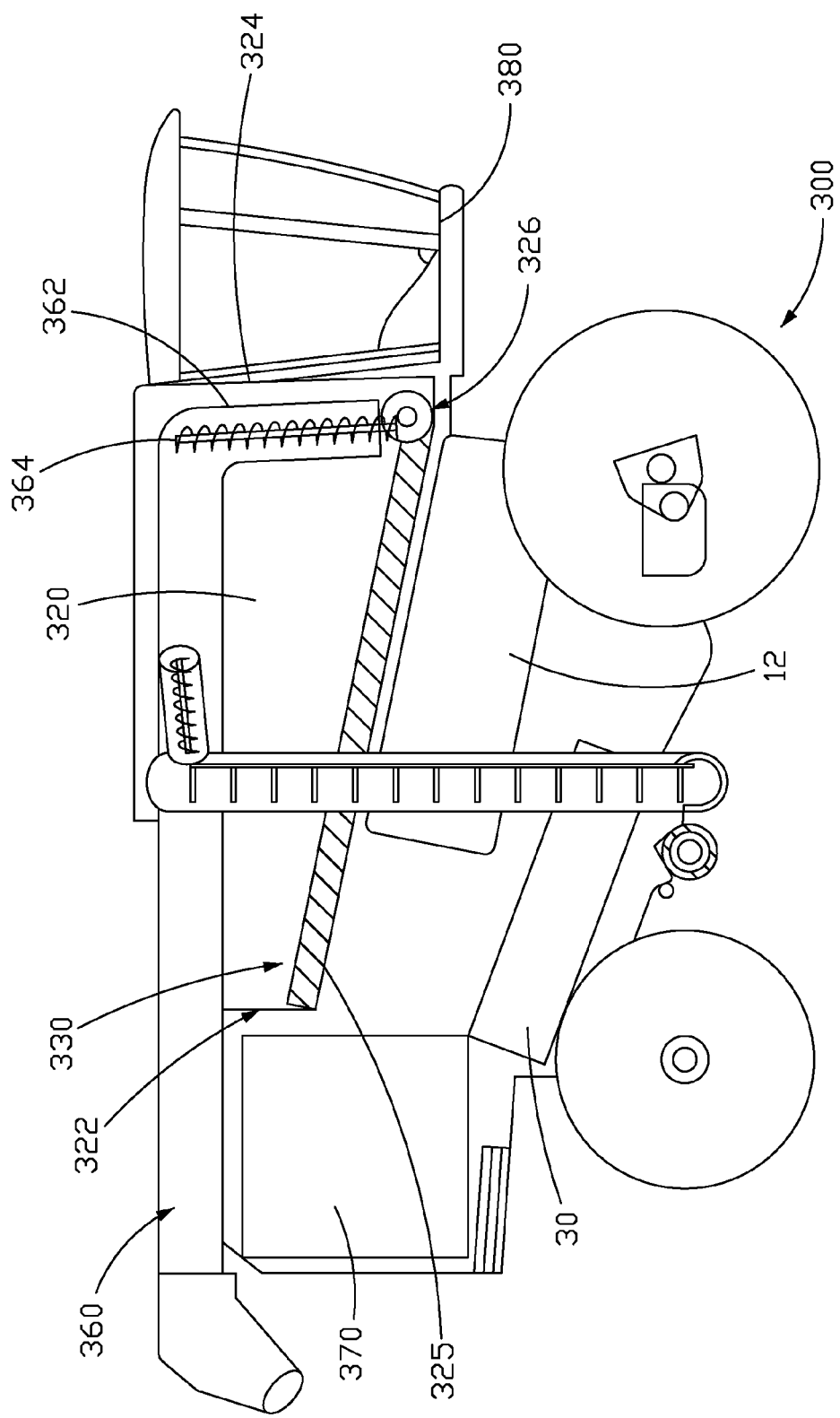
FIG. 3 illustrates a side view of an exemplary combine for use with embodiments of the present invention.

FIG. 1 through FIG. 3 shows exemplary agricultural combines in which exemplary embodiments of the present invention may be implemented. FIG. 1 shows an exemplary agricultural combine 100, which may also be referred as a combine or harvester throughout this specification. As shown in FIG. 1, the combine 100 may include a combine frame 116 and a feeding system 114, having a header 110 and a movable feeding mechanism 112. The movable feeding mechanism may have a position which includes an angle α relative to a portion of the combine frame 116. Combine 100 may also include a longitudinally axially arranged threshing and separation system 12, and a concave 20 within the threshing and separation system 12. The threshing mechanism may also be of any well known construction and operation. In some embodiments, the concave 20 may also be used with combines having transversely aligned threshing and separation system in a combine.

As shown, threshing and separation system 12 is axially arranged, in that it includes a cylindrical threshing rotor 14 conventionally supported and rotatable in a predetermined direction about a rotational axis therethrough for conveying a flow of crop material in a helical flow path through a threshing chamber 16 extend circumferentially around the rotor 14. As shown, concaves 20 may extend circumferentially around the rotor 14 and the flow of crop may pass in the space between the spinning rotor and the concaves. As the crop material flows through the threshing and separation system 12, the crop material including, for example, grain, straw, legumes, and the like, will be loosened and separated from crop residue or MOG (material other than grain) such as, for example, husks, cobs, pods, and the like, and the separated materials may be carried away from the threshing and separation system 12 in a well known conventional manner. Crop residue can be redistributed to the field via a spreader 120, located at the back of the harvester.

The remaining threshed crop, which includes the grain to be collected, is then cleaned via a cleaning system. The cleaning system can include conventional winnowing mechanisms including a fan 176 that blows air across a series of reciprocating sieves 172. Through the winnowing action of the air and the reciprocating sieves 172, clean grain may be collected and sorted from the remaining chaff. Crop-handling systems, which include augers and elevators, may be used to transport cleaned crop, such as grain, to a grain tank 150 and from the grain tank 150 to a grain cart (not shown). Crop-handling systems may also transport tailings materials back to the cleaning system/threshing system through tailings elevator 174. The clean grain may be conveyed to the grain tank 150 via a cross auger that conveys grain laterally from the bottom of the cleaning system to a vertical conveyor (or elevator) that conveys grain up a load tube to be spilled into grain tank 150. At the bottom of grain tank 150, one or more grain tank augers (such as cross augers) move grain laterally from the bottom of the grain tank 150 to vertical tube 162 of unload tube 160, representing a turret style system of offloading. Vertical tube 162 may include a single unload conveying auger or multiple unload conveying augers, such as an auger for propelling grain up and to another auger within the unload tube 160. Unload tube 160 may be rotated such that it may extend its full length laterally for unloading grain from the grain tank 150 to a support vehicle, such as a truck that is driving along the side of the combine 100. Unload tube 160 may also be oriented to the rear for storage, as shown. In a swivel style offloading system (not shown), the vertical tube 162 and unload tube 160 is replaced by an unload conveying auger that is attached to the one or more cross augers conveying grain from the cleaning system and may pivot from side to side from the combine 100, conveying grain from the combine 100.

FIG. 2 shows a transparent cross-sectional view of another agricultural combine 200 in which exemplary embodiments of the present invention may be implemented. Combine 200 includes a grain tank 220 and a threshing system 12 for threshing crop, such as grain. The threshed crop is then cleaned via the cleaning system 30. The surface in cleaning system 30 separates out clean grain which collects along the path of the bottom of the cleaning system at cross auger 205. The cross auger 205 moves the clean grain laterally to an elevator 210, which includes a paddle chain lift 212. The paddle chain lift 212, wherein the paddles are uniformly spaced along the chain to lift grain, conveys the grain upward to a dispenser auger 237 that discharges the grain into the grain tank 220. In other arrangements, the grain is lifted from the paddle chain lift 212 and then flipped at the top of the elevator to a sump, containing a bubble-up auger. The bubble-up auger transports grain from the sides of the grain tank 220 to the top center of the tank where the grain is discharged in the center of the tank 220 to naturally form a cone-shape pile, wherein the angles of the sides of the cone equal the angle of repose of the grain. Other arrangements implement other auger assemblies to either distribute the grain evenly along the bottom of the grain tank 220 or centrally in the middle of the grain tank 220. In this arrangement of grain tank 220, sloping side walls 222 and 224 are sloped such that as grain accumulates in the grain tank 220 as conveyed from dispenser auger 237, the grain naturally slides down to cross augers 226 and 228. These side walls 222 and 224 are sloped at such an angle that they convene at the bottom of the tank 220 to form the 'W' shape floor bottom, as shown. Grain tank cross augers 226 and 228 convey the accumulated grain laterally so that it may be collected into vertical tube 262 which includes a unload conveying vertical auger 264 that propels the grain upward. This allows grain to be moved into an unload vehicle via unload tube 260, which may include another unload conveying internal auger and may rotate about a pivot coextensive with vertical tube 262. Non-storable grain volume 270 is identified by slash marks in FIG. 2 to show space effectively unusable between the grain tank, and the threshing system 12 due to the geometry of the sloped sides 222 and 224 forming the floor of the grain tank 220.

FIG. 3 shows another agricultural combine 300 in which exemplary embodiments of the present invention may be implemented. Combine 300 includes an engine 370, cab 380 a grain tank 320. Grain tank 320 includes vertical side walls 322 and 324 and generally flat bottom 325. Along the bottom 325 of grain tank 320, a conveying system 330 is placed. Bottom 325 includes an active conveying system 330 such that grain tank 320 need not rely on gravity to feed grain into the cross auger. Conveying system 330, in some embodiments, conveys collected grain forward in the grain tank 320 to a single grain tank cross auger 326. Cross auger 326 then conveys the grain laterally to be collected by vertical tube 362, which includes a vertical unload conveying auger 364 to propel the grain upward. This sends grain into an unload tube 360, which may include another unload conveying auger (not shown).

Figure 4:
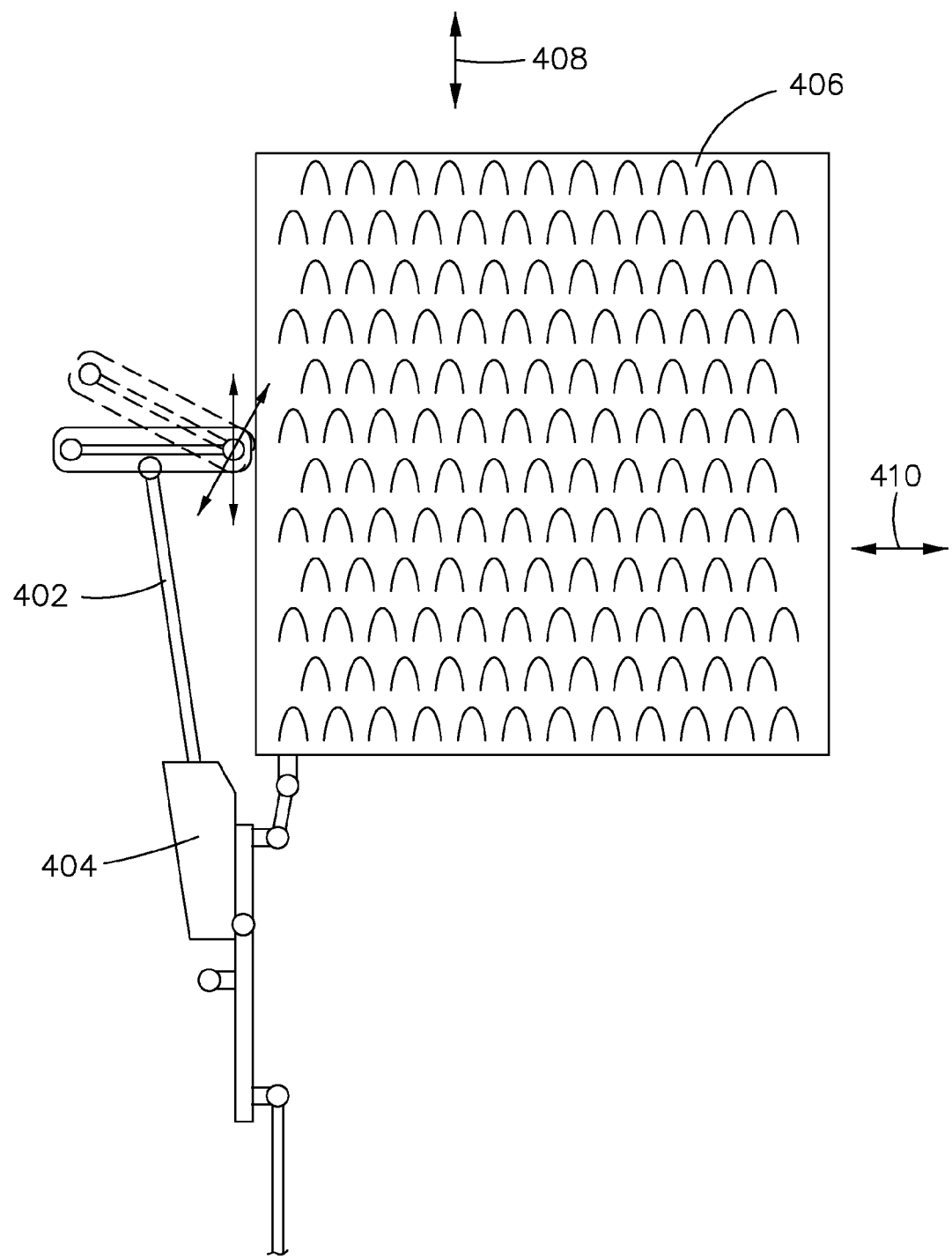
FIG. 4 illustrates an exemplary side-shaking mechanism and sieve for use with embodiments of the present invention.

FIG. 4 illustrates an exemplary side-shaking mechanism and sieve for use with embodiments of the present invention. As shown at FIG. 4, side-shaking mechanism 402 is coupled to sieve 406. Arrows 408, shown at FIG. 4, represent the fore/aft movement of sieve 406. The side-to-side motion of sieve 410, which may include movement in an arc or in a substantially diagonal motion, is represented by arrows 410.

Figure 9:
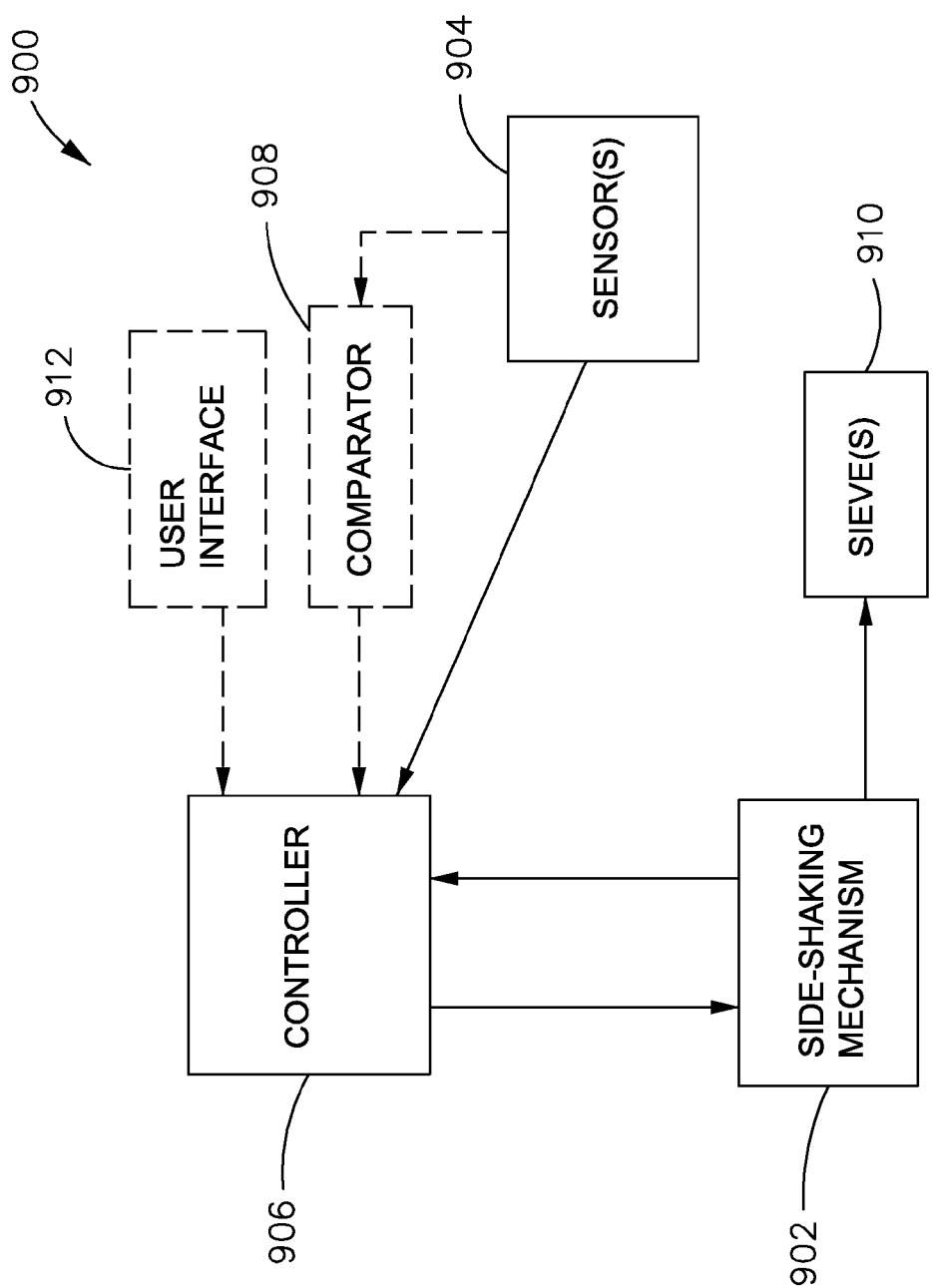
FIG. 9 is a system diagram illustrating an exemplary embodiment of the present invention.

FIG. 9 is a combine side-shaking control system diagram illustrating an exemplary embodiment of the present invention. As shown in FIG. 9, a combine side-shaking control system may include at least one sieve 910 for separating crop material, such as grain, from other materials (MOG) and a side-shaking mechanism 902, coupled to the at least one sieve 910, configured to move the at least one sieve 910 in a side-to-side motion. The combine side-shaking control system may include at least one sensor 904 for sensing at least one operating condition of a combine system. Combine systems may include, but are not limited to a combine separator system, a combine feeder system, a combine engine, a combine threshing system, a combine cleaning system, a combine crop-handling system, a combine residue system, and a combine drive system.

The control system may include a controller 906. In some embodiments, controller 906 may receive sensed data directly from the at least one sensor 904. The combine side-shaking control system may optionally include a comparator 908. In some embodiments, shown by the dotted-line path in FIG. 9, comparator 908 may receive sensed data from the at least one sensor 904 and compare the sensed data to at least one predetermined threshold value. Controller 906 may then receive the compared data from comparator 908. Controller 906 may cause side-shaking mechanism 902 to stop moving the at least one sieve 910 in the side-to-side motion or start moving the at least one sieve in the side-to-side motion based on the sensed data from the at least one sensor 904, or optionally from the compared data from comparator 908.

In some embodiments, sensors 904 may include a separator system engaging sensor, a feeder system engaging sensor, operational system speed sensors, crop flow sensors and a feeder system position sensor. The controller 906 may then cause the side-shaking mechanism 902 to stop moving at least one sieve 910 in the side-to-side motion or start moving the at least one sieve 910 in a side-to-side motion based on the sensed data from each of these sensors.

According to one aspect of an exemplary embodiment, a combine side-shaking control system may include multiple sieves, such as sieves 172, shown at FIG. 1. In another aspect, a combine side-shaking control system may include a single sieve, such as sieve 406, shown at FIG. 4.

In some embodiments, a combine side-shaking control system may include a side-shaking mechanism, such as side-shaking mechanism 402, coupled to sieve 406, as shown at FIG. 4. It is also contemplated that a side-shaking mechanism, such as side-shaking mechanism 402, may be coupled to multiple sieves, such as sieves 172, shown at FIG. 1. A combine side-shaking control system may also include side-shaking mechanisms, other than side-shaking mechanism 402, which are configured to move the at least one sieve in a side-to-side motion. A side-shaking mechanism 402 may also include an actuator, such as actuator 404, for contributing to the movement of the side-shaking mechanism 402 and sieve 406. It is also contemplated that other devices, such as a motor, may contribute to the movement of the side-shaking mechanism.

According to one exemplary embodiment, a combine side-shaking control system may include a separator system engaging sensor for sensing if a separator system is engaged and a feeder system engaging sensor for sensing if the feeder system is engaged. The separator system and the feeder system may be engaged and disengaged separately using electronic controls in the combine cab. Typically, the separator switch is engaged prior to the feeder switch being engaged. The separator system may be engaged if at least one combine sub-system is engaged, such as the combine feeder system, a combine crop-handling system, a combine threshing system, a combine cleaning system and a combine residue system is engaged.

Separator system engaging sensors may include, but are not limited to pressure sensors, torque sensors and force sensors. Pressure sensors may be used to monitor the pressure of the liquid (such as hydraulic oil) or gas used to engage the separator or one or more of its sub systems. The pressure may have some relationship to the engine's rotations per minute (RPM), and hence the cleaning system operating speed. Pressure sensors may include, but are not limited to a piezoresistive strain gauge, a capacitive sensor, an electromagnetic sensor, a piezoelectric sensor, an optical sensor, a potentiometric sensor, a thermal sensor, an ionization sensor, a resonant sensor, a hydrostatic gauge, a liquid column gauge, a piston-type gauge, an aneroid gauge, a McLeod gauge, a Bourdon pressure gauge, and a diaphragm gauge.

The separator or its subsystems could be engaged with electrical components such as an electric motor or linear actuator. The force or torque exerted by these components to keep the subsystems engaged may have some relationship to the engine operational speed. The force or torque exerted by these electrical components may be related to the current drawn by the components. Therefore, any monitoring of the current may be indicative of the engine speed (and hence the cleaning system speed).

Torque sensors may be used to determine the torque transmitted by a shaft connected to any of the sub-systems. Torque sensors may include, but are not limited to strain gauges, magneto elastic torque sensors and optical or mechanical sensors for observing the shaft deflection.

Force sensors may be used to determine the operational status of the separator or cleaning system. Typically a force sensor is created using one or more strain gauges. This sensor could observe the force at various locations, such as an engine mounting location. The force may also be observed by components which move when the separator is engaged. These components may include, but are not limited to a linkage connected to the cleaning system, rods, tension belts and chains, and the combine chassis where these items attach.

In one exemplary embodiment, a combine side-shaking control system may include operational system speed sensors for sensing respective operational speeds of a combine engine, a combine drive system, the combine feeder system, a combine crop-handling system, a combine threshing system, a combine cleaning system and a combine residue system. Operational system speed sensors may include but are not limited to magnetic sensors, accelerometers, optical sensors, inductive sensors, global positioning sensors, and radar sensors.

A combine side-shaking control system may also include a comparator, such as, comparator 908, for comparing each of the operational speeds to respective predetermined speed threshold values to produce compared operational speed values. A controller, such as controller 906, may cause the side-shaking mechanism to stop moving the at least one sieve in the side-to-side motion or start moving the at least one sieve in the side-to-side motion based on the compared operational speed values.

For example, an operational system speed sensor, such as an RPM sensor, may sense the speed of a combine engine. Comparator 908 may compare the speed of the combine engine to a predetermined engine speed threshold value, such as for example 90% of high idle speed, to produce compared operational speed value. High idle speeds may also be predetermined and may vary between combines. The compared operational speed value may indicate whether the engine speed is operating at 90% of high idle speed, below 90% of high idle speed or above 90% of high idle speed. Controller 906 may then cause side-shaking mechanism 902 to stop moving the at least one sieve in the side-to-side motion or start moving the at least one sieve in the side-to-side motion based on the compared operational speed value. Predetermined engine speed threshold values may include different percentages of high idle speed. Predetermined engine speed threshold values may also be based on factors other than percentages of high idle speed.

In another aspect of an exemplary embodiment, a magnetic pickup sensor may be used to sense the operating speed of the cleaning system. FIG. 5E illustrates a magnetic pickup sensor 510 used to sense the operating speed of the cleaning system according to an exemplary embodiment. Magnetic pickup sensor 510 may sense the presence of one of the arms used to suspend the cleaning system. The magnetic pickup sensor may sense the presence of the arm once per cycle of the cleaning system.

For example, a magnetic pickup sensor may be used to sense the teeth (tabs) on a wheel, counting the number of pulses, producing a number of RPM. Comparator 908 may then compare the RPM to a predetermined speed threshold value, such as a predetermined RPM value, producing a compared RPM value. Controller 906 may cause the side-shaking mechanism to stop moving the at least one sieve in the side-to-side motion or start moving the at least one sieve in the side-to-side motion based on the compared RPM value.

In another aspect, a combine side-shaking control system may include an operational system speed sensor for sensing a ground speed of a combine. Comparator 908 may then compare the combine ground speed to a predetermined ground speed threshold value to produce a compared combine ground speed value. Controller 906 may then cause the side-shaking mechanism to stop moving the at least one sieve in the side-to-side motion or start moving the at least one sieve in the side-to-side motion based on the compared combine ground speed value over a predetermined period of time. It is also contemplated that a combine side-shaking control system may include a timer for determining a system's speed over a period of time. For example, a timer may be used for determining a period of time that the combine ground speed remains at or below the predetermined ground speed threshold value. Controller 906 may then cause the side-shaking mechanism to stop moving the at least one sieve in the side-to-side motion if the ground speed remains at or below the predetermined ground speed threshold value for a predetermined period of time.

Figure 5A:
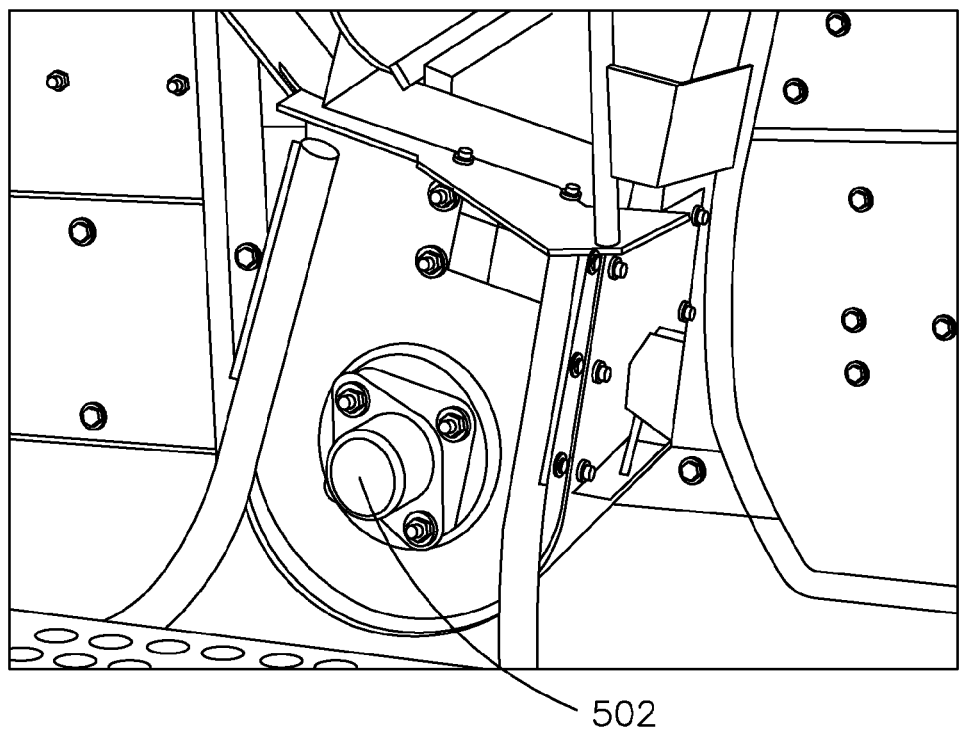
FIG. 5A through FIG. 5E illustrate exemplary operational system speed sensors for use with embodiments of the present invention.
Figure 5B:
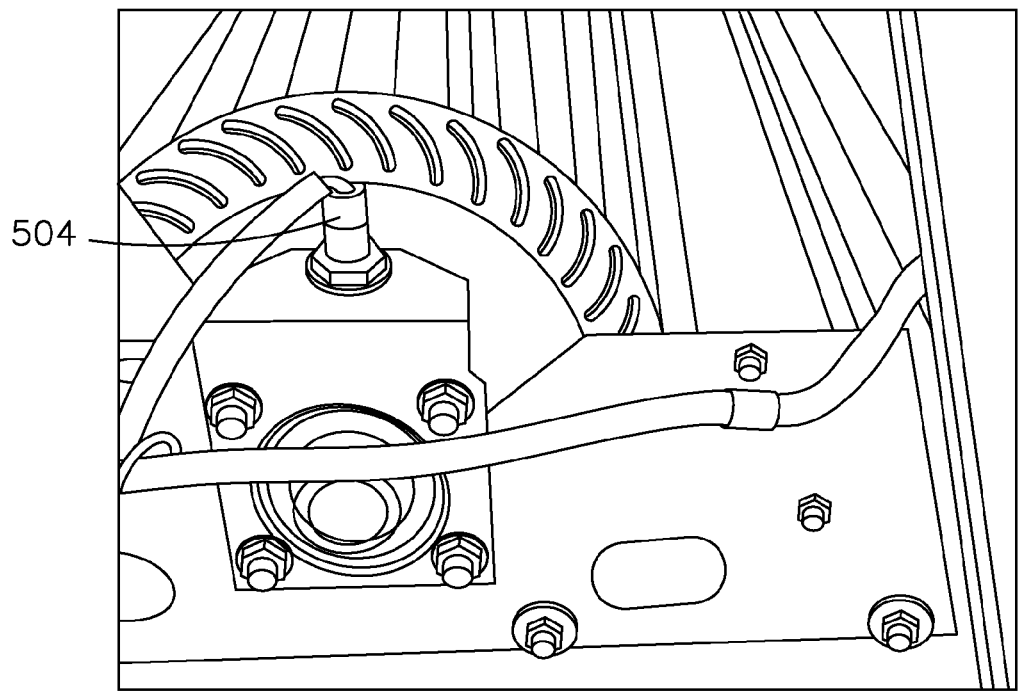
Figure 5C:
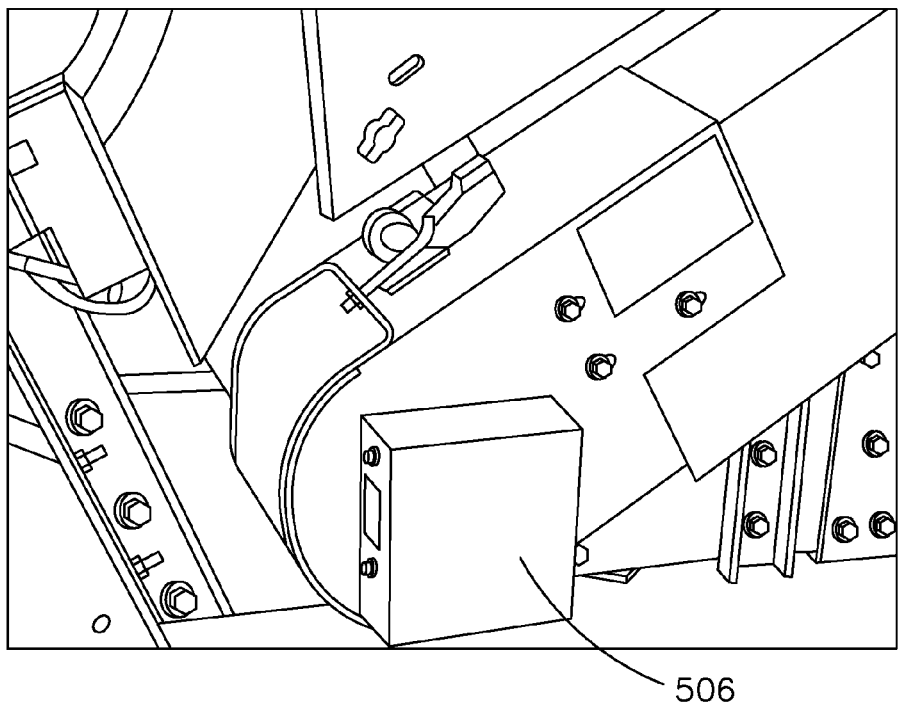
Figure 5D:
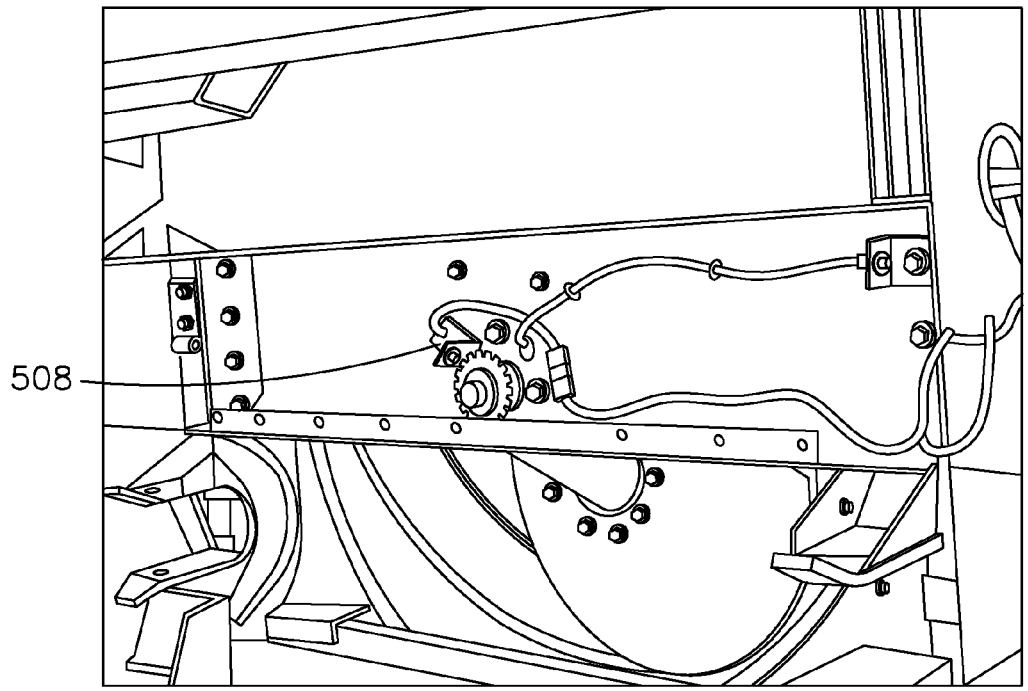
Figure 5E:
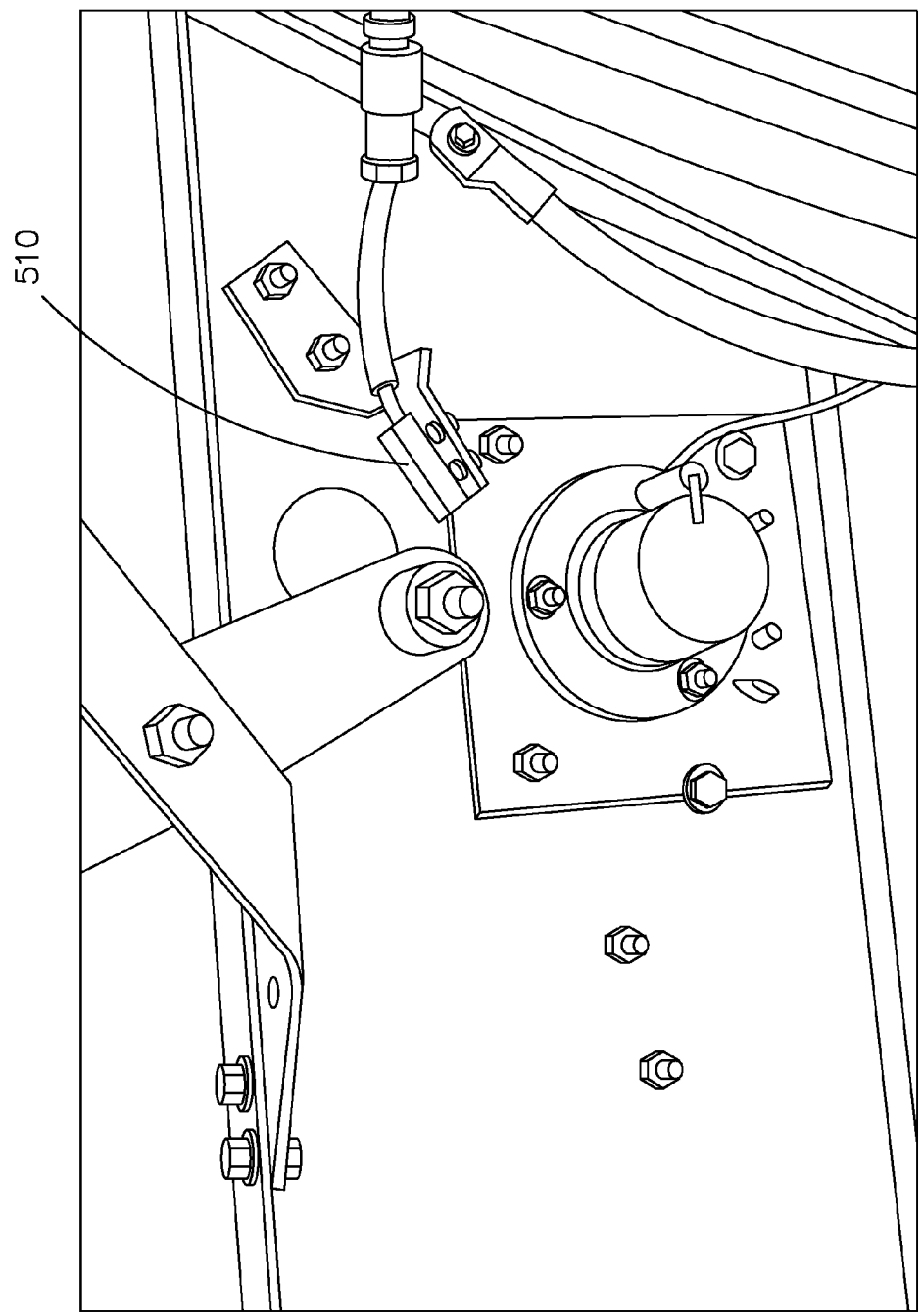

Other exemplary operational system speed sensors for use with embodiments of the present invention are shown at FIG. 5A through 5D. FIG. 5A illustrates an exemplary operational system speed sensor 502 of a combine cleaning system. 5B illustrates an exemplary operational system speed sensor 504 of a combine tailings system. 5C illustrates an exemplary operational system speed sensor 506 of a combine fan. 5D illustrates an exemplary operational system speed sensor 508 of a combine rotor.

In some embodiments, controller 906 may cause the side-shaking mechanism to stop moving the at least one sieve in the side-to-side motion when the speed of a combine system is at or below a percentage of a harvest operating speed, torque, pressure, or force, such as, for example 80%, and preferably ranging from 30% to 99%. It is contemplated, however, that other percentages may be used. An operator may also select the percentage.

Figure 6A:
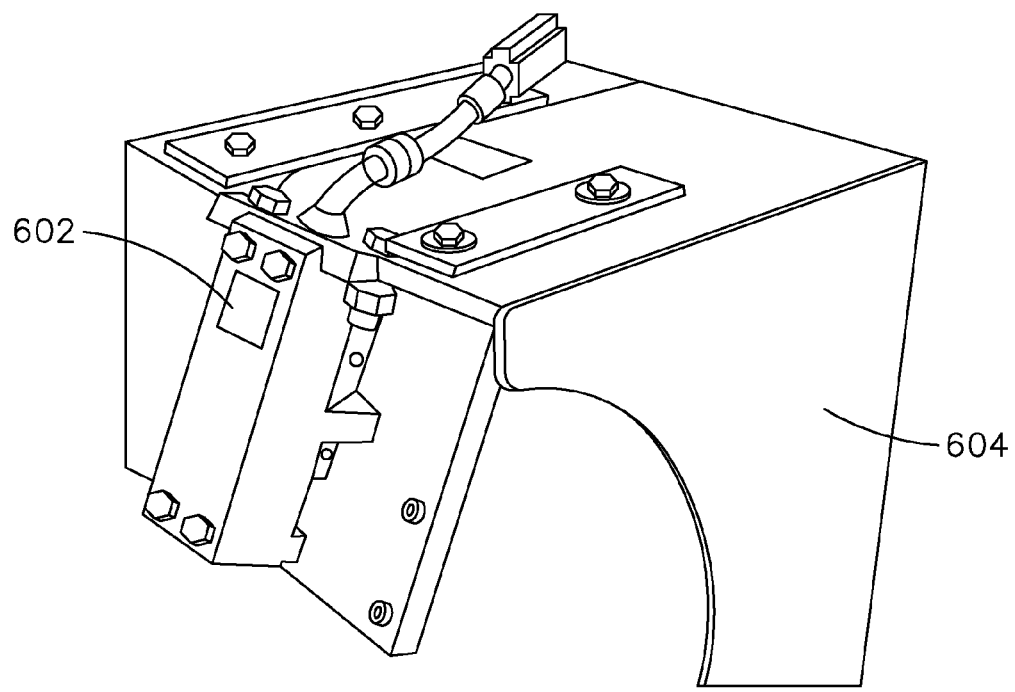
FIGS. 6A and 6B illustrate exemplary crop flow sensors for use with embodiments of the present invention.
Figure 6B:
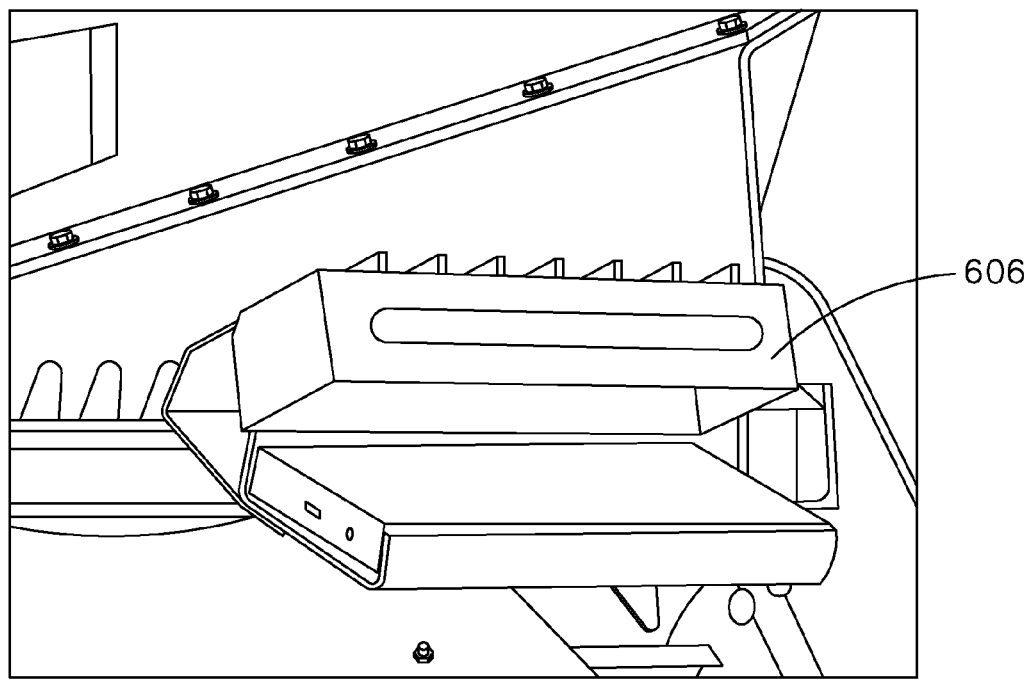

In one exemplary embodiment, a combine side-shaking control system may include crop flow sensors for sensing respective crop rates moving through a combine feeder system, a combine crop-handling system, a combine threshing system, a combine cleaning system and a combine residue system. Crop flow sensors may include, but are not limited to optical sensors, force sensors, torque sensors, grain detectors and potentiometers. For example, a crop flow sensors maybe used to sense the torque of a shaft, or the force on a plate, strap, or rod to determine the amount of crop, such as grain, flowing into a grain tank. FIG. 6A illustrates an exemplary crop flow sensor 602 located at the top of a clean grain elevator 604, which may be used with an exemplary embodiment of the present invention. FIG. 6B illustrates another exemplary crop flow sensor 606, which may be used with an exemplary embodiment of the present invention.

A combine side-shaking control system may also include a comparator, such as, comparator 908, for comparing the crop rates to respective predetermined crop rate threshold values to produce compared crop rate values. A controller, such as controller 906, may cause the side-shaking mechanism to stop moving the at least one sieve in the side-to-side motion or start moving the at least one sieve in the side-to-side motion based on the compared crop rate values.

Figure 7:
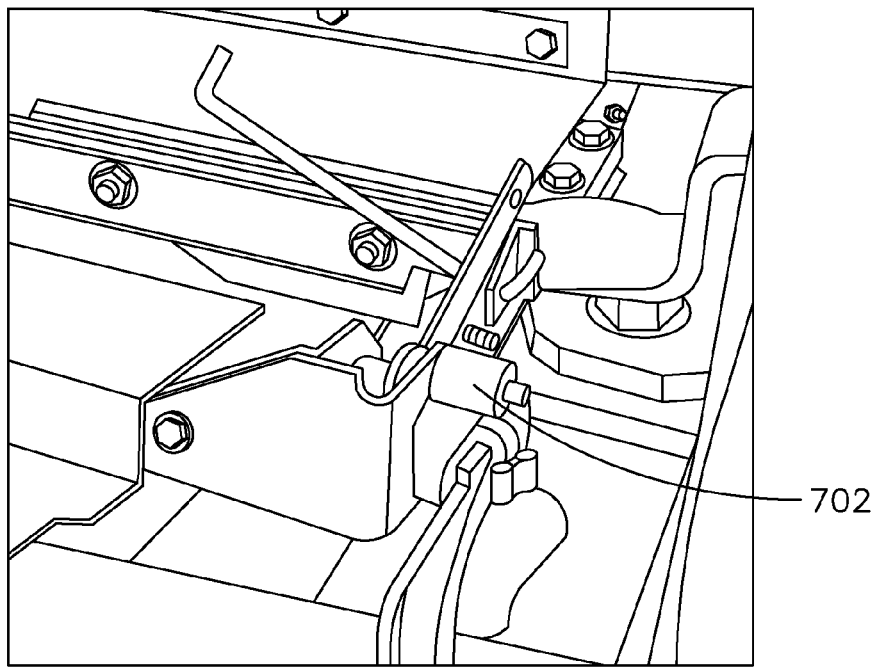
FIG. 7 illustrates an exemplary feeder system position sensor for use with embodiments of the present invention.
Figure 8:
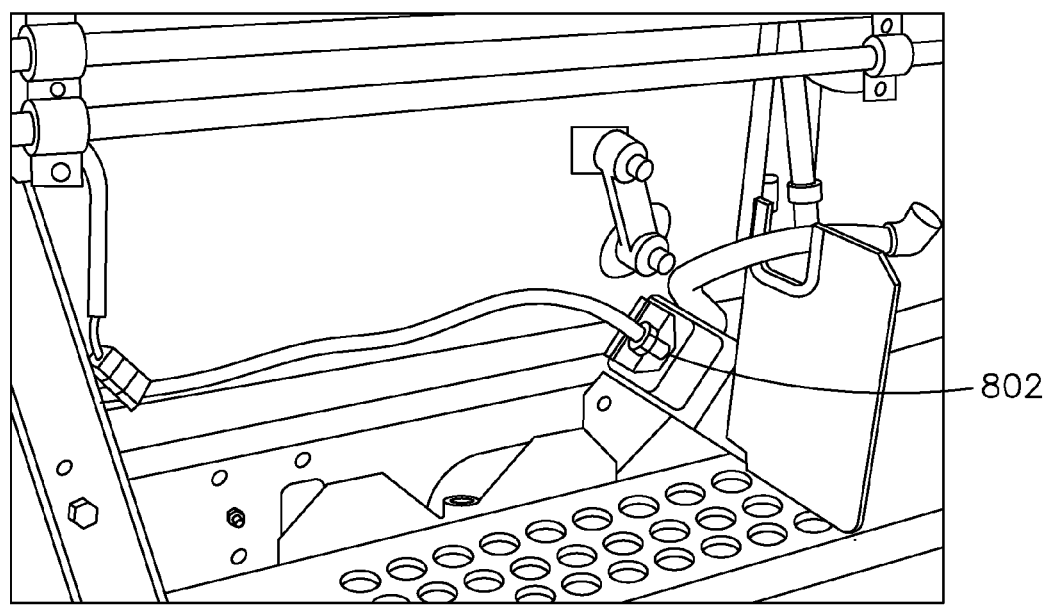
FIG. 8 illustrates an exemplary radar sensor for sensing ground speed of a combine for use with embodiments of the present invention.

In another exemplary embodiment, a combine side-shaking control system may include a feeder system position sensor for sensing a position of a feeder mechanism, such as feeder mechanism 112, relative to a portion of combine frame 116. The position of the feeder mechanism 112 may include an angle α relative to the portion of the combine frame 116. The combine side-shaking control system may also include comparator, such as comparator 908, for comparing angle α to a predetermined threshold position, which may include a predetermined threshold angle to produce a compared angle. Controller 906 may then cause the side-shaking mechanism to stop moving the at least one sieve in the side-to-side motion or start moving the at least one sieve in the side-to-side motion based on the compared angle. Feeder system position sensors may include, but are not limited to potentiometers, optical sensors, ultrasonic sensors, infrared sensors, laser sensors, inductive sensors, accelerometers, gas bubble in liquid sensors, pendulum sensors, electrolytic sensors, and liquid capacitive sensors. FIG. 7 illustrates an exemplary feeder system position potentiometer 702, which may be used with an exemplary embodiment of the present invention.

A combine side-shaking control system may include a user interface 912. In some embodiments, controller 906 may receive user data at user interface 912, causing the side-shaking mechanism 902 to stop moving the at least one sieve 910 in the side-to-side motion or start moving the at least one sieve 910 in the side-to-side motion based on the user data. For example, an operator may electrically control the amount of side-shake of side-shaking mechanism 902 to a desired value via an electrical switch, button, lever, or other selectable item on the user interface 912, which may include a digital display. The amount of side-shake may range from no side shake to maximum side shake, allowing the operator to the operator to signal controller 906 to cause side-shake mechanism 902 to engage regardless of whether controller 906 causes the side-shaking mechanism to start moving the at least one sieve 910 based on sensed data from sensors 904. The user interface 912 may also be used to provide information to the operator such as ground speed, shaft speed, and crop yield. The user interface 912 may further be used to control combine settings, such as the speed of the threshing system or sieve openings.

In other exemplary embodiments, a combine side-shaking control system may include at least one sensor 904 for sensing at least one operating condition of a combine system and a controller, such as controller 906, for receiving the at least one operating condition and causing the side-shaking mechanism 902 to stop moving at least one sieve 910 in the side-to-side motion or start moving the at least one sieve 910 in a side-to-side motion based on the at least one operating condition. The at least one sensor 904 may be a sensor from any of the sensor recited above. The at least one operating condition may be an operating condition of a combine system from a group of combine systems, which include a combine separator system, a combine feeder system, a combine engine, a combine threshing system, a combine cleaning system, a combine crop-handling system, a combine residue system, and a combine drive system.

The at least one operating condition sensed by the at least one sensor 904 may be an operating condition from a group of operating conditions. The group of operation conditions may include whether the separator system is activated. The separator system may include at least one of the combine feeder system, the combine crop-handling system, the combine threshing system, the combine cleaning system and the combine residue system. The group of operation conditions may also include whether the feeder system is activated independent from the separator system. As described above, the separator system and the feeder system may be engaged and disengaged separately using electronic controls in the combine cab. Typically, the separator switch is engaged prior to the feeder switch being engaged. The separator system may be engaged if at least one combine sub-system is engaged, such as the combine feeder system, a combine crop-handling system, a combine threshing system, a combine cleaning system and a combine residue system is engaged.

In one embodiment, if the at least one sieve 910 is not moving in the side-to-side motion, controller 906 may causes the side-shaking mechanism 902 to move to a predetermined zero position and remain in the predetermined zero position until the at least one operational condition has reached a predetermined threshold value in at least one of a combine feeding system, a combine crop-handling system, a combine threshing system, a combine cleaning system and a combine residue system. The predetermined zero position corresponds to a position of the side-shaking mechanism 902 substantially centered between first and second side limits of the side-to-side motion.

The group of operation conditions may also include whether an operational system speed has reached a predetermined speed threshold value in at least one of the combine drive system, the combine feeder system, the combine crop-handling system, the combine threshing system, the combine cleaning system and the combine residue system. For example, a magnetic pickup sensor 510 may be used to sense the operating speed, such as the RPM, of the cleaning system. Comparator 908 may then compare the RPM to a predetermined speed threshold value, such as a predetermined RPM value, producing a compared RPM value.

The group of operation conditions may also include whether an operational system speed of a combine system has reached a predetermined speed threshold value for a predetermined amount of time in at least one of the combine feeder system, the combine crop-handling system, the combine threshing system, the combine cleaning system and the combine residue system. For example, an operational system speed sensor, such as radar sensor 802 may be used for sensing a ground speed of a combine. Comparator 908 may then compare the combine ground speed to a predetermined ground speed threshold value to produce a compared combine ground speed value.

The group of operation conditions may also include whether a rate of crop flow has reached a predetermined threshold value in at least one of the combine feeder system, the combine crop-handling system, the combine threshing system, the combine cleaning system and the combine residue system. For example, an exemplary crop flow sensor, such as sensor 602 may be used to determine the rate of grain flowing through a clean grain elevator 604, into clean grain elevator 604 or out of clean grain elevator 604.

The group of operation conditions may also include whether a position of a feeder mechanism of the combine feeder system has reached a predetermined threshold position. The position of the feeder mechanism may include an angle of the feeder mechanism relative to a combine frame. For example, the position of the feeder mechanism 112 may include an angle α relative to the portion of the combine frame 116. Comparator 908 may then compare angle α to a predetermined threshold position, which may include a predetermined threshold angle to produce a compared angle.

According to one exemplary embodiment, a controller, such as controller 906, may receive a first operating condition of the group of operating conditions from a first sensor of the at least one sensor 904. Controller 906 may then cause side-shaking mechanism 902 to stop moving the at least one sieve in the side-to-side motion based on the first operating condition. Controller 906 may receive a second operating condition of the group of operating conditions from the first sensor. Controller 906 may then cause the side-shaking mechanism 902 to start moving the at least one sieve in the side-to-side motion based on the second operating condition.

For example, controller 906 may receive a first operating condition, such as a compared combine engine speed value (indicating that the engine speed is operating below 90% of high idle), from an operational system speed sensor via comparator 908. Controller 906 may then cause side-shaking mechanism 902 to stop moving the at least one sieve in the side-to-side motion based on the first operating condition. Controller 906 may also receive a second operating condition, such as a compared combine engine speed value (indicating that the engine speed is operating at or above 90% of high idle) from an operational system speed sensor via comparator 908. Controller 906 may then cause the side-shaking mechanism 902 to start moving the at least one sieve in the side-to-side motion based on the second operating condition.

According to another exemplary embodiment, controller 906 may receive a first operating condition of the group of operating conditions from a first sensor of the at least one sensor 904. Controller 906 may then cause the side-shaking mechanism 902 to start moving the at least one sieve in the side-to-side motion based on the first operating condition. Controller 906 may receive a second operating condition of the group of operating conditions from a second sensor of the at least one sensors 904 and the controller causes the side-shaking mechanism 902 to stop moving the at least one sieve in the side-to-side motion based on the second operating condition.

For example, controller 906 may receive a first operating condition, such as a compared combine engine speed value (indicating that the engine speed is operating at or above 90% of high idle) from an operational system speed sensor via comparator 908. Controller 906 may then cause the side-shaking mechanism 902 to start moving the at least one sieve in the side-to-side motion based on the first operating condition. Controller 906 may then receive a second operating condition, such as an RPM value (indicating that the operational system speed of a combine system has reached a predetermined speed threshold value), from a second sensor, such as magnetic pickup sensor 510, via comparator 908. Controller 906 may then cause side-shaking mechanism 902 to stop moving the at least one sieve in the side-to-side motion based on the second operating condition (the compared RPM value indicating that the speed of a combine system is below a predetermined speed threshold value).

Figure 10:
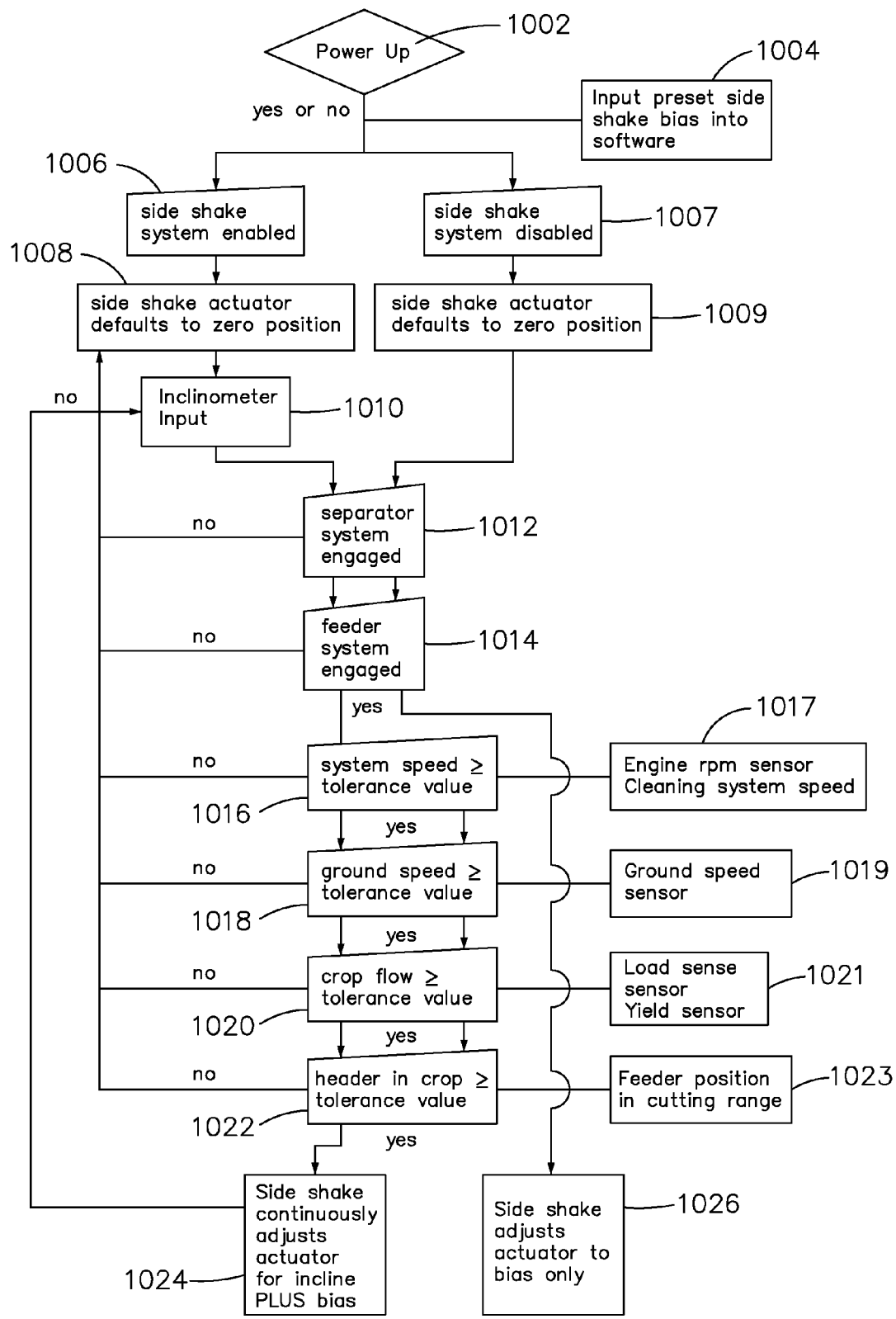
FIG. 10 is a flow chart illustrating an exemplary method for controlling operation of a side-shaking mechanism in a combine in accordance with an embodiment of the invention.

FIG. 10 is a flow chart illustrating an exemplary method for controlling operation of a side-shaking mechanism in a combine in accordance with an embodiment of the invention. As shown in step 1002, the method includes powering up the combine. At step, 1004 side-shaking mechanism bias data, indicating a distance for moving the side-shaking mechanism away from the predetermined zero position on each side, may be preset (prior to harvesting) into software installed in the combine. The bias data may be set by the factory or set by an operator of a combine. The bias data may also be physically set, for example by a switch or lever. The bias data may be set based on an operator experiencing uneven distribution of crop in the cleaning system or other factors while the combine is on flat ground. For example, the bias data may indicate moving the side-shaking mechanism a distance of 2 millimeters away from the predetermined zero position on each side. It is contemplated, however, that the bias data may indicate movement other than 2 millimeters. It is also contemplated that the bias data may indicate zero movement.

As shown at steps 1006 and 1008, the method may include enabling the side-shaking mechanism and moving the side-shaking mechanism to a predetermined zero position. The side-shaking mechanism may remain in the predetermined zero position until the side-shaking mechanism is moved in a side-to-side motion at step 1024.

As shown at step 1008, the method may include receiving incline data, from an incline sensor, such as an inclinometer, representing the inclination of the combine. The incline data indicates a distance for moving the side-shaking mechanism away from the predetermined zero position on each side. The predetermined zero position corresponds to a position of the side-shaking mechanism substantially centered between first and second side limits of the side-to-side motion. For example, the incline data may indicate moving the side-shaking mechanism a distance ranging from 0-22 millimeters away from the predetermined zero position on each side. It is contemplated, however, that the incline data may indicate movement outside the range of 0-22 millimeters.

As shown at step 1012, 1014, and 1016-1023, the method may include receiving sensed data, from at least one sensor, representing at least one operating condition of a combine system. At step 1012, sensed data may be received from a combine separator system indicating whether the separator system is activated. The separator system may include at least one of a combine feeder system, a combine crop-handling system, a combine threshing system, a combine cleaning system and a combine residue system. At step 1014, sensed data may be received from a combine feeder system indicating whether the combine feeder system is activated independent from the combine separator system. Controller 906 may then cause the side-shaking mechanism 902 to stop moving the at least one sieve 910 in the side-to-side motion, as shown at step 1008, or start moving the at least one sieve 910 in the side-to-side motion, as shown at step 1024, based on the sensed data of the combine separator system or the combine feeder system.

At step 1016, sensed data may be received indicating whether an operational system speed has reached a predetermined speed threshold value in at least one combine system, such as the combine drive system, the combine feeder system, the combine crop-handling system, the combine threshing system, the combine cleaning system and the combine residue system. In an aspect of an exemplary embodiment, this step may include receiving a compared engine speed value, from comparator 908 and an engine speed sensor shown at step 1017, indicating whether a speed of the combine engine has reached a predetermined percentage of a high idle speed of the combine engine. In another aspect of an exemplary embodiment, this step may include receiving a compared cleaning system speed value, from comparator 908 and a cleaning system speed sensor also shown at step 1017, indicating whether a speed of the combine cleaning system has reached a predetermined percentage of a high idle speed of the combine engine, also shown at step 2017. Controller 906 may then cause the side-shaking mechanism 902 to stop moving the at least one sieve 910 in the side-to-side motion, as shown at step 1008, or start moving the at least one sieve 910 in the side-to-side motion, as shown at step 1024, based on the operational system speed data and the compared data.

At step 1018, sensed data may be received indicating whether an operational system speed of a combine system has reached a predetermined speed threshold value for a predetermined amount of time in at least one combine system, such as the combine feeder system, the combine crop-handling system, the combine threshing system, the combine cleaning system and the combine residue system. In an aspect of an embodiment, this step may include received a ground speed of a combine from an engine speed or ground speed sensor, shown at step 1019. Comparator 908 may then compare the combine ground speed to a predetermined ground speed threshold value to produce a compared combine ground speed value. Controller 906 may then cause the side-shaking mechanism 902 to stop moving the at least one sieve 910 in the side-to-side motion, as shown at step 1008, or start moving the at least one sieve 910 in the side-to-side motion, as shown at step 1024, based on the compared combine ground speed value over a predetermined period of time.

At step 1020, sensed data may be received indicating whether a rate of crop flow has reached a predetermined threshold value in at least one combine system, such as the combine feeder system, the combine crop-handling system, the combine threshing system, the combine cleaning system and the combine residue system. In an aspect of an embodiment, the step may include receiving a compared crop flow value indicating whether a rate of crop flow has reached a predetermined percentage of a combine system flow capacity. For example, as shown at step 1021, sensed data may be received from a crop flow sensor, such as sensor 602, indicating a rate of crop flow through clean grain elevator 604, into clean grain elevator 604 or out of clean grain elevator 604. Comparator 908 may then compare the rate of crop flow to a predetermined maximum rate capacity to produce a compared crop rate value. Controller 906 may then cause the side-shaking mechanism 902 to stop moving the at least one sieve 910 in the side-to-side motion, as shown at step 1008, or start moving the at least one sieve 910 in the side-to-side motion, as shown at step 1024, based on the compared crop rate value. Maximum predetermined rate capacities may be within different percentage ranges, such as 0.25% to 90%.

At step 1022, sensed data may be received indicating the position of a combine header. In an aspect of an embodiment, the step may include receiving sensed data indicating whether a position of a feeder mechanism of the combine feeder system has reached a predetermined threshold position, as shown at step 1023. Comparator 908 may compare the position of the combine feeder mechanism to a predetermined threshold position. The position of the feeder mechanism may include an angle of the feeder mechanism relative to a combine frame. Controller 906 may then cause the side-shaking mechanism 902 to stop moving the at least one sieve 910 in the side-to-side motion, as shown at step 1008, or start moving the at least one sieve 910 in the side-to-side motion, as shown at step 1024, based on the compared feeder position value.

In one embodiment, controller 906 may cause the side-shaking mechanism to stop moving at least one sieve in the side-to-side motion, as shown at step 1008, or start moving the at least one sieve in a side-to-side motion, as shown at step 1024 based on the incline data received at step 1010, the sensed data received at steps 1012, 1014, and 1016-1023 and the side-shaking mechanism bias data received at step 1004. In an aspect of an embodiment, controller 906 may cause the side-shaking mechanism to start moving the at least one sieve in a side-to-side motion based on data received at each of steps 1012, 1014, and 1016-1023. In another aspect, controller 906 may cause the side-shaking mechanism to start moving the at least one sieve in a side-to-side motion based on data received at one or more of steps 1012, 1014, and 1016-1023.

As described above, the side-shaking mechanism may be disabled at step 1006. Controller 906 may cause the side-shaking mechanism to stop moving at least one sieve in the side-to-side motion or start moving the at least one sieve in a side-to-side motion based on the sensed data, the incline data and the side-shaking mechanism bias data if the side-shaking mechanism is enabled, as shown at step 1024. Alternatively, side-shaking mechanism 902 may be disabled, as shown at step 1007. Controller 906 may then cause the side-shaking mechanism to move to the predetermined zero position and stop moving the at least one sieve in a side-to-side motion, at step 1009, or controller 906 may cause the side-shaking mechanism to start moving the at least one sieve in a side-to-side motion based only on the side-shaking mechanism bias data, as shown at step 1026. The side-shaking mechanism may then remain in the predetermined zero position until the side-shaking mechanism becomes enabled and is moved in a side-to-side motion at step 1024. The bias data may, for example, indicate moving the side-shaking mechanism a distance of 2 millimeters away from the predetermined zero position on each side.

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

What is claimed is:

1. A method for controlling operation of a side-shaking mechanism in a combine comprising:

enabling the side-shaking mechanism using at least one controller;

moving the side-shaking mechanism to a predetermined zero position;

receiving incline data with the at least one controller, from an incline sensor, representing the inclination of the combine;

receiving sensed data with the at least one controller, from at least one sensor, representing at least one operating condition of a combine system;

causing the side-shaking mechanism with the at least one controller to (i) stop moving at least one sieve in the side-to-side motion or (ii) start moving the at least one sieve in a side-to-side motion based on the incline data, the sensed data and side-shaking mechanism bias data;

wherein the predetermined zero position corresponds to a position of the side-shaking mechanism substantially centered between first and second side limits of the side-to-side motion, and the incline data indicates a first distance for moving the side-shaking mechanism away from the predetermined zero position on each side;

receiving with the at least one controller the side-shaking mechanism bias data indicating a second distance for moving the side-shaking mechanism away from the predetermined zero position on each side.

2. A method for controlling operation of a side-shaking mechanism in a combine comprising:
   enabling the side-shaking mechanism using at least one controller;
   moving the side-shaking mechanism to a predetermined zero position;
   receiving incline data with the at least one controller, from an incline sensor, representing the inclination of the combine;
   receiving sensed data with the at least one controller, from at least one sensor, representing at least one operating condition of a combine system;
   causing the side-shaking mechanism with the at least one controller to (i) stop moving at least one sieve in the side-to-side motion or (ii) start moving the at least one sieve in a side-to-side motion based on the incline data, and the sensed data; and
   wherein the step of receiving sensed data, from at least one sensor, representing at least one operating condition of a combine system further comprises:
      receiving sensed data from a combine separator system indicating whether the separator system is activated, the separator system comprising at least one of a combine feeder system, a combine crop-handling system, a combine threshing system, a combine cleaning system and a combine residue system;
      receiving sensed data from a combine feeder system indicating whether the combine feeder system is activated independent from the combine separator system;
      receiving data indicating whether an operational system speed has reached a predetermined speed threshold value in at least one of the combine drive system, the combine feeder system, the combine crop-handling system, the combine threshing system, the combine cleaning system and the combine residue system;
      receiving data indicating whether an operational system speed of a combine system has reached a predetermined speed threshold value for a predetermined amount of time in at least one of the combine feeder system, the combine crop-handling system, the combine threshing system, the combine cleaning system and the combine residue system;
      receiving data indicating whether a rate of crop flow has reached a predetermined threshold value in at least one of the combine feeder system, the combine crop-handling system, the combine threshing system, the combine cleaning system and the combine residue system; and
      receiving data indicating whether a position of a feeder mechanism of the combine feeder system has reached a predetermined threshold position, wherein the position of the feeder mechanism comprises an angle of the feeder mechanism relative to a combine frame.

3. A method for controlling operation of a side-shaking mechanism in a combine comprising:
   enabling the side-shaking mechanism using at least one controller;
   moving the side-shaking mechanism to a predetermined zero position;
   receiving incline data with the at least one controller, from an incline sensor, representing the inclination of the combine;
   receiving sensed data with the at least one controller, from at least one sensor, representing at least one operating condition of a combine system;
   causing the side-shaking mechanism with the at least one controller to (i) stop moving at least one sieve in the side-to-side motion or (ii) start moving the at least one sieve in a side-to-side motion based on the incline data, and the sensed data
   disabling the side-shaking mechanism; and
   the step of causing the side-shaking mechanism to (i) stop moving at least one sieve in the side-to-side motion or (ii) start moving the at least one sieve in a side-to-side motion is based on:
      side-shaking mechanism bias data if the side-shaking mechanism is disabled, wherein the side-shaking mechanism bias data indicates a distance for moving the side-shaking mechanism away from the predetermined zero position on each side; and
      the sensed data, the incline data and the side-shaking mechanism bias data if the side-shaking mechanism is enabled.

4. The method of claim 2, wherein the step of receiving data indicating whether an operational system speed has reached a predetermined speed threshold value comprises receiving a compared engine speed value indicating whether a speed of the combine engine has reached a predetermined percentage of a high idle speed of the combine engine.

5. The method of claim 2, wherein the step of receiving data indicating whether an operational system speed has reached a predetermined speed threshold value comprises receiving a compared cleaning system speed value indicating whether a speed of the combine cleaning system has reached a predetermined percentage of a high idle speed of the combine engine.

6. The method of claim 2, wherein the step of receiving data indicating whether a rate of crop flow has reached a predetermined threshold value comprises receiving a compared crop flow value indicating whether a rate of crop flow has reached a predetermined percentage of a combine system flow capacity.

* * * * *